June 11, 1968    O. N. OWEN    3,387,437
PNEUMATIC COTTON HARVESTER
Filed July 26, 1967    6 Sheets-Sheet 1

INVENTOR
ORLANDO N. OWEN
BY
ATTORNEYS

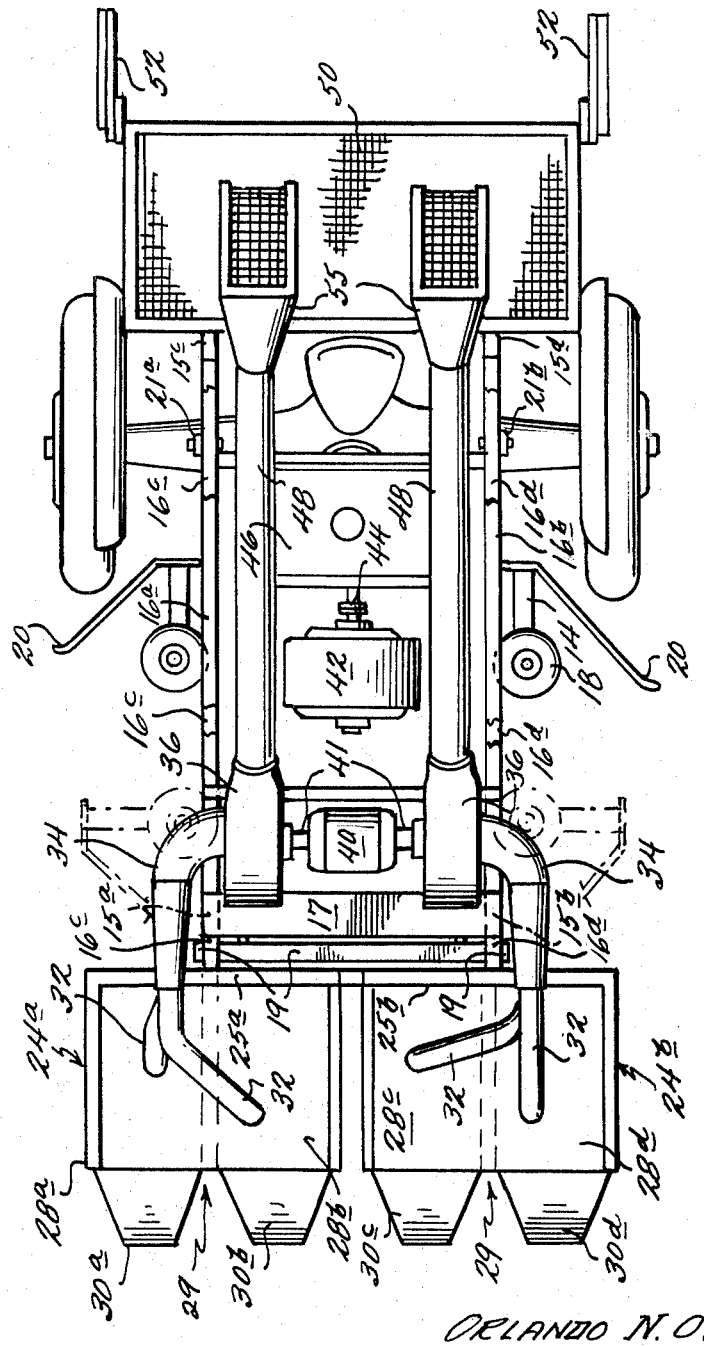

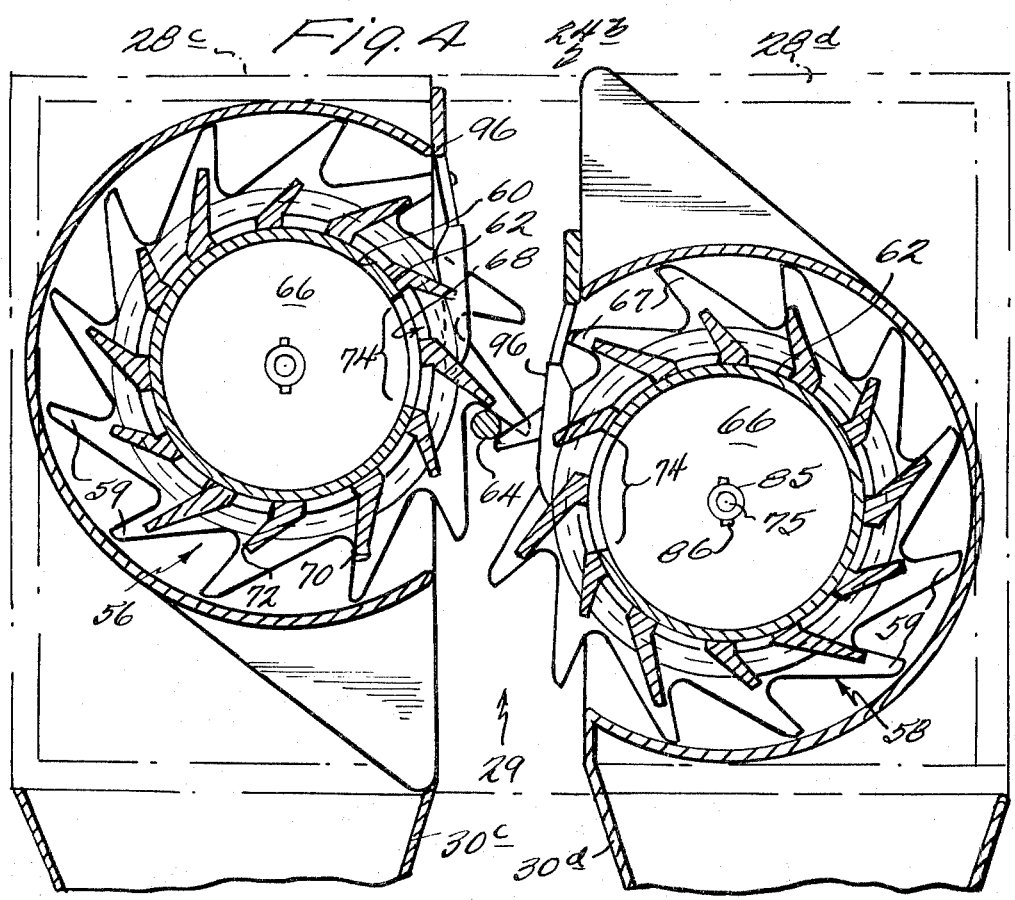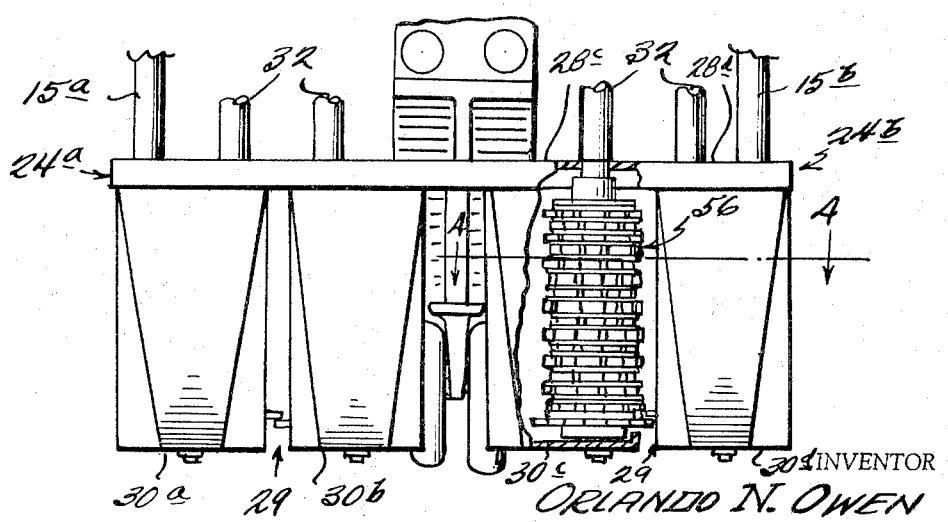

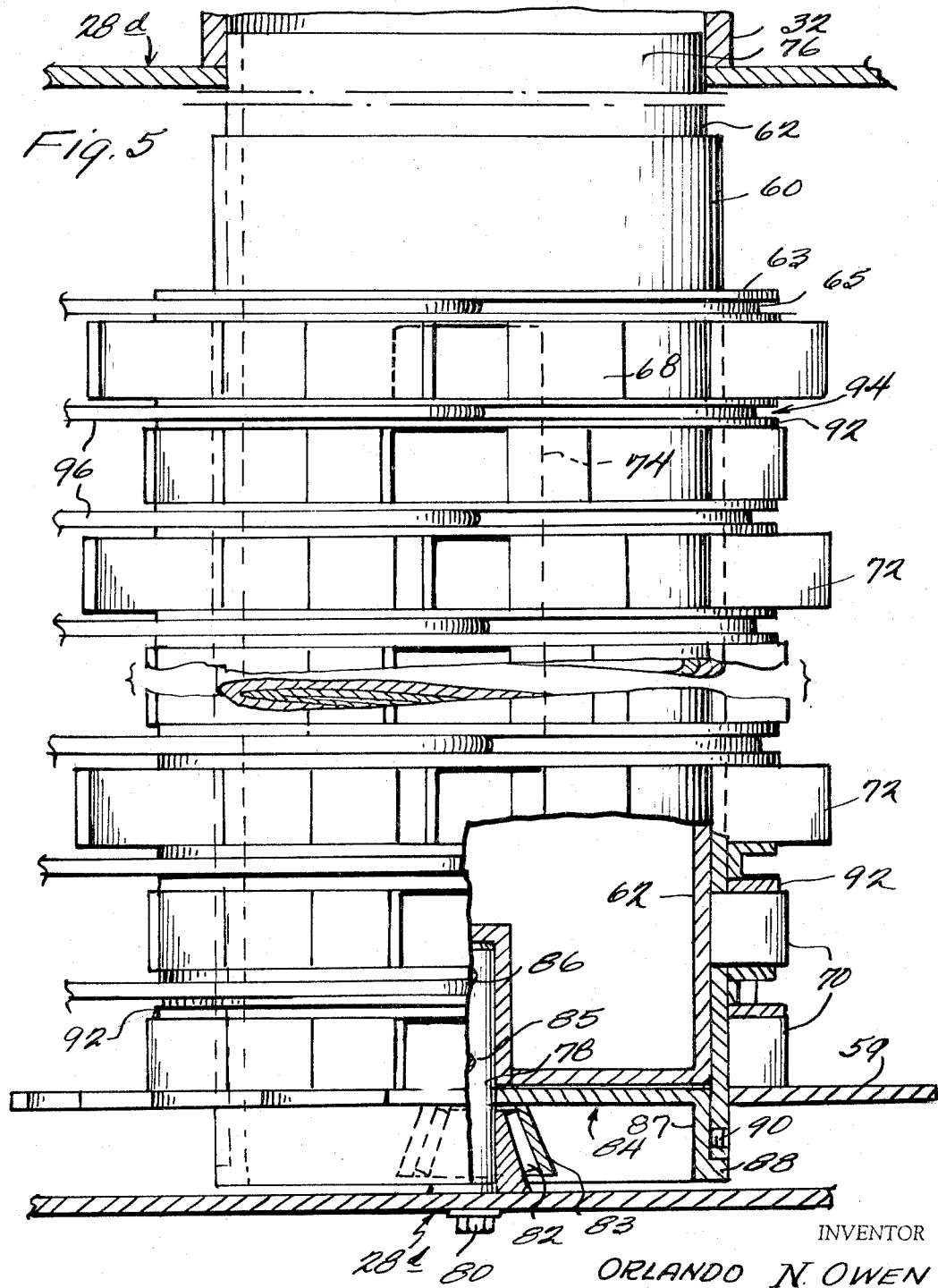

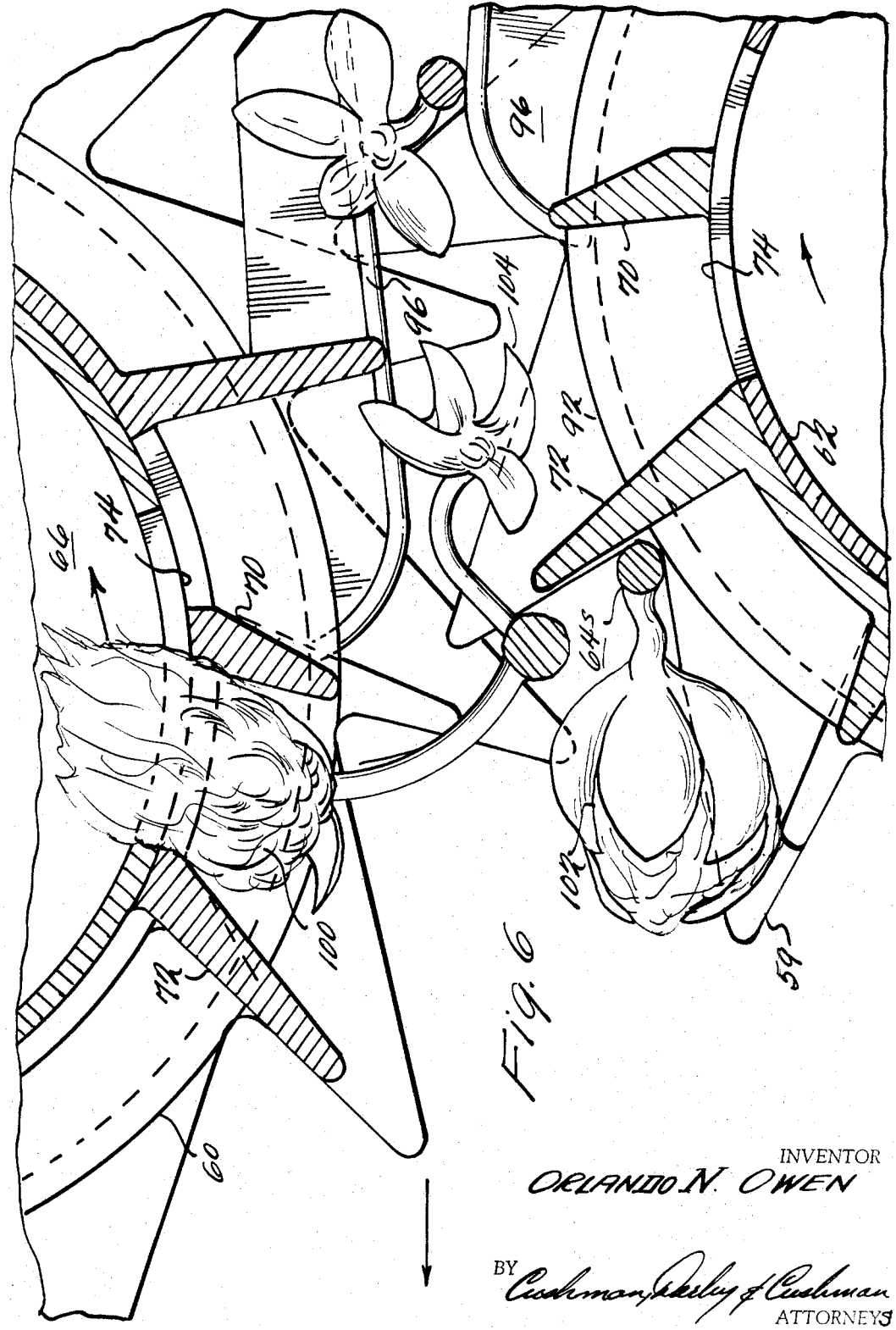

INVENTOR
ORLANDO N. OWEN

United States Patent Office 3,387,437
Patented June 11, 1968

3,387,437
PNEUMATIC COTTON HARVESTER
Orlando N. Owen, P.O. Box 602,
Clarksdale, Miss. 38614
Filed July 26, 1967, Ser. No. 656,119
16 Claims. (Cl. 56—12)

ABSTRACT OF THE DISCLOSURE

An improved method for pneumatically harvesting cotton is disclosed, as are the means related thereto. Said means include a substantially vertical fixed cylindrical housing subject to suction with a substantially vertical slot therein on the side of said housing, the improvement being a revolvable cylindrical casing having openings which communicate directly with the cotton plant. Said openings being large enough to enable cotton lint to be sucked through said casing and slot into the fixed housing. Also disclosed are means to cam the cotton plant against the casing, and guard means to cam the plant away from the casing. An attachment for a tractor to carry cotton picking apparatus is also disclosed.

BACKGROUND OF THE INVENTION

Field of the invention

The invention relates to that subclass in the art of cotton harvesting where the harvesting unit is composed of a drum, cylinder, or the like, rotating on its axis with means to engage and remove cotton lint from the plant, as well as those subclasses in the same art which utilize pneumatic means to assist in detaching cotton lint from the boll and pneumatically conveying it to a receptacle.

Description of prior art

Heretofore cotton harvesting machines have been unsatisfactory for at least one of several different reasons. Spindle pickers require that the cotton be dampened before harvested, and the absorption of moisture damages both the cotton and the seed. After harvesting, the cotton must be dried at considerable expense. The high drying temperatures damage staple and spoil the seed by causing formation of free fatty acid therein; this lowers the price of the cotton staple as well as the seed oil. One example of a spindle picker is disclosed in Patent 2,650,462 to Skaggs.

The present invention does not require that the cotton be dampened as a step in harvesting. The cotton is therefore of better quality and the farmer's return is higher, also both the cotton ginner and oil miller save money on expensive drying equipment and power costs.

Other cotton pickers are elaborate and expensive and yet they still either leave matured cotton on the plant, or pick unmatured bolls, or scoop up or suck in cotton burrs, twigs and other trash, thus causing the cotton to grade several points lower than hand picked cotton. Examples of cotton pickers are disclosed in Patent 2,702,976 to Diserens, Patent 1,953,639 to Waggoner, and Patent 1,225,193 to Vittetoe.

The present invention is uncomplicated and inexpensive. The most preferred embodiment includes a unique harvesting unit on a simple self-contained attachment for standard size tractors. In addition, the present invention, by a unique combination of suction and radial teeth, separates the mature cotton from the unopen bolls, holds trash intake to an insignificant percentage, and still removes substantially all the matured cotton in virtually the same dry, clean condition as hand picked cotton.

In addition to the above-mentioned patents, other patents that may be considered as prior art are Patent 2,836,951 to Annis which discloses a freely rotatable drum with suction nozzles and Patents 423,537 to Todd and 353,085 to Sears which disclose various shaped picking arms extending from rotatable cylinders.

BRIEF SUMMARY OF THE INVENTION

In a substantially vertical cotton harvesting unit having a fixed cylinder subject to interior suction, an improvement is disclosed whereby a rotatable casing, with air ports in the upright wall of said casing, communicates directly with the plant to be harvested. Also disclosed are teeth means on said casing to cam plants to the casing and bar means to cam the plant away. In addition, a frame capable of attachment to a farm tractor, and capable of carrying said harvesting unit is disclosed, as is an improved method of pneumatically harvesting cotton whereby lint is pneumatically sucked toward the harvesting means and the burr is moved away from the harvesting means.

BRIEF DESCRIPTION OF THE DRAWINGS

The invention will be understood more readily by reference to the following examples; however, these examples are intended to illustrate the invention and are not to be construed to limit the scope of the invention.

FIGURE 2 is a top plan view of the apparatus disclosed in FIGURE 1;

FIGURE 3 is an enlarged partially cutaway front elevation of housing units 24(a) and 24(b) in harvesting position;

FIGURE 4 is a horizontal sectional view of line 4—4 of FIGURE 1;

FIGURE 5 is a cutaway elevational view of the fixed housing and rotatable casing surrounding it;

FIGURE 6 is a top plan diagrammatic view showing twin cotton harvesting units engaging a cotton plant.

FIGURE 1 illustrates a frame 10 attached to a conventional farm tractor 12 carrying the unique cotton harvesting unit and means to pneumatically convey the harvested cotton to a depository. It is well understood that said frame and the mechanisms mounted thereon may be carried either as an attachment for a tractor as disclosed in the illustration or as an integral part of a unitary cotton harvester.

Figure 1:
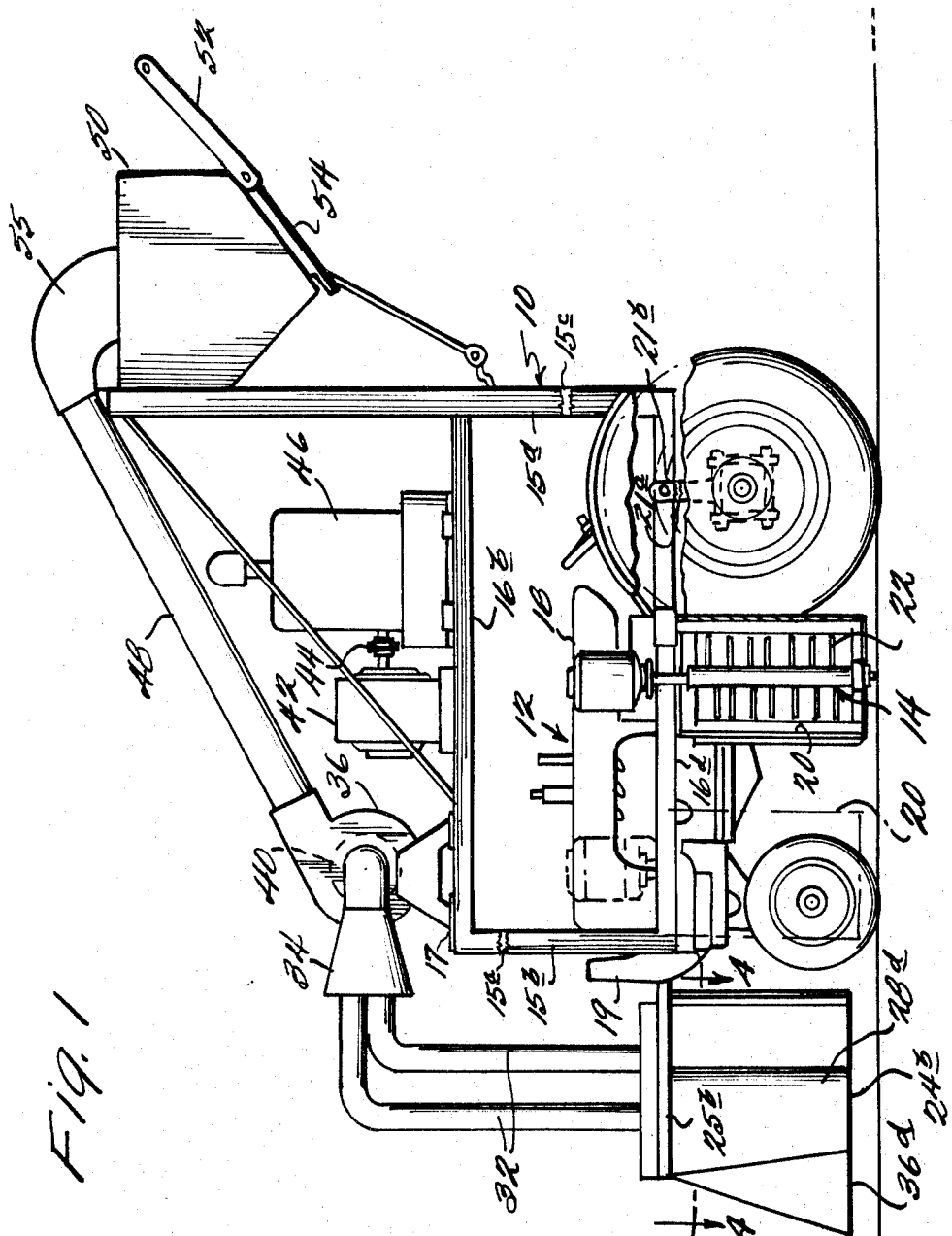
FIGURE 1 is a partially cutaway side elevational view of the cotton harvesting unit, the means for conveying the cotton to a depository, and a tractor upon which the invention is mounted.

The preferred arrangement is shown. Such an attachment enables the farmer to utilize less expensive equipment in more ways. It is estimated that such an arrangement can cut the cost of most cotton harvesting equipment by one half to three quarters.

The rectangular frame consists of four vertical beams—15(a) and (b) in front and 15(c) and (d) in back, which are connected to four horizontal beams—16(a) and (b) on top and 16(d) and (c) on the bottom. The two rectangles are joined by bar 17 across the top front of the frame. The frame is rendered more rigid by means of the cross beams upon which the combustion engine 46 rests. Beams 15(c) and (d) extend beyond beams 16(a) and (b) to carry the depository. Beams 16(c) and (d) extend beyond beams 15(a) and (b) to carry the housings for harvesting units. The frame 10 is mounted on the tractor by means of "U" supports, said supports being open on top. Beams 16(c) and (d) rest on a large "U" support 19 which may be permanently carried by the tractor. Smaller individual "U" supports 21(a) and (b) are secured to the axle inside of the wheel guards and support the two beams 16(c) and (d) respectively at the back of the tractor. Thus, it will be well recognized that the frame carrying the entire cotton harvesting apparatus and pneumatic conveying and depository means may be attached to the tractor with minimum effort. Once the twin stalk cutters 14 are detached from the frame, and the frame jacked higher than the "U" supports, the tractor may be backed out from beneath the suspended frame. Because the frame carries the entire means for harvesting cotton, with the exception of the "U" supports, after the frame is removed the tractor is ready for other farm purposes.

The twin stalk cutters 14 are mounted on parallel frame beams 16(c) and (d) of the frame 10. The cutters operate off of a five horsepower electric motor 18 but could be operated by any other conventional means well known in the art. The cutter is shown in FIGURE 1 in a non-operative condition with the shield 20 positioned between the cutting blades 22 and the plant row. Thus, the blades 22 are harmlessly exposed to the furrow and cannot contact the cotton plant. The cutter is shown by phantom lines in forward cutting position on frame beams 16(c) and (d), with the shield 20 positioned between the cutting blades and the furrow so that the blades are exposed to the plant row. The shield 20 is conventionally designed to guide the plants into the blades. By positioning such a stalk cutter on the harvesting frame, it may be utilized as part of the final step in the harvesting process. This eliminates an additional cutting step after harvesting. An example of such a stalk cutter is disclosed in my patent, No. 920,636 (1909).

The cotton harvesting machine disclosed in FIGURE 1 is designed to carry means for harvesting two rows of cotton simultaneously. It is well understood that the number of rows to be harvested is merely a matter of preference and is not critical. Two housings 24(a) and (b) are shown to be carried by supports 25(a) and 25(b), which are affixed to the extensions of frame beams 16(c) and (d). Within each housing are two individual opposed companion enclosures 28(a), (b) in 24(a) and 28(c), (d) in 24(b). Each encloses a harvesting unit (shown in FIG. 4 as 56 and 58). Said companion housings 28(a) and (b), and 28(c) and (d) and the harvest units therein are spaced apart to define a plant passage 29 by means of forwardly extending and tapered guides 30(a) and (b), and 30(c) and (d).

FIGURE 2 is a top plan view of the apparatus disclosed in FIGURE 1. Inasmuch as the mechanisms for harvesting cotton from even individual row is substantially identical, corresponding mechanisms have been given identical, reference numbers. In this view, it can be seen that four suction pipes 32 feed into elbow joints 34 which are connected to housings 24(a) and 24(b). Each pipe 32 is connected to a harvesting unit (FIGURE 3). The units are arranged in pairs within individual housings 28(a), (b), (c) and (d) which in turn are carried inside the twin housings 24(a) and (b) respectively. Each set of twin pipes 32 is shown to extend into respective twin fans 36. These fans create suction to pull harvested cotton through the harvesting units in pipes 32.

The fans are driven by electric motor 40 which is seated between the fans and drivingly connected thereto by shafts 41. A generator 42 supplies power (by means not shown) to the electric motor 40 and to stock cutter motors 18 (by means not shown). The preferred method of activating the generator 42 is to drivingly connect it by suitable means 44 to a combustion engine 46, thereby providing a self contained unit which requires no power takeoffs from tractor 12. This mode of operation has been found to be inexpensive and readily adaptable to a conventional farm tractor. However, it will be appreciated that the particular drive means is not critical to the invention; alternate drive means are well known in the art for such a purpose.

The harvested cotton lint is sucked from the units 28(a), (b), (c) and (d) through pipes 32 and then is blown by fans 36 through larger pipes 48 to a connecting elbow pipe 55. It can be seen that the elbow pipe as well as the hopper 50 is covered with wire mesh. The forced air from the fans escapes through this wire mesh and the cotton falls, aided by gravity from the connecting pipes 55 into the hopper 50.

Thus the harvested cotton lint is conveyed by means of suction through the units 28(a), (b), (c) and (d) through pipes 32 and then is blown by the fans 36 through the pipes 48 to the connecting elbow pipe 55, where it falls by gravity into the depository hopper 50. The depository in the illustration can be emptied at the convenience of the operator by pulling handle 52 to release trap door 54.

Dimensions given herein with regard to the cottom harvesting machine are not intended to restrict the disclosure but rather afford a description of typical size mechanisms contemplated by the instant invention.

In the preferred embodiment of the harvester, the combustion engine 46 is a fifty horsepower air cooled, four cylinder model, and it drives a forty horsepower generator 42 of either A.C. or D.C. design. The generator provides electricity for the twenty horsepower electric motor 40 which turns thirty inch blower fans 36. The cotton is sucked into the blowers through eight inch pipes and blown out through eleven inch pipes into the hopper.

FIGURE 3 illustrates a cutaway front elevation of housing units 24(a) and (b) showing the guides 30(a), (b), (c) and (d) which are mounted on the individual housings 28(a), (b), (c) and (d) respectively. The tapered guide on unit 28(c) is partially cut away to illustrate enclosed companion harvesting unit 56. A second unit 58 is disclosed in FIGURE 4. The harvesting units are substantially identical and therefore, description of any one is understood to pertain to all. There is a harvesting unit behind each guide means 30 and located within each individual housing 28.

It can be seen that the suction pipes 32 are fitted over a sleeve in the top of harvesting units 56 and 58 and are supported by the top deck of the housings 24(a) and 24(b). FIGURE 4 shows how cotton is directed by the guides 30(c) and (d) into passageway 29 between the harvesting units 56 and 58.

FIGURE 4 discloses a cross section of single housing unit 24(b) showing twin housings 28(c) and (d), guides 30(c) and (d), and harvesting units 56 and 58. Disks consisting of sprocket teeth 59 are located at the bottom of rotatable casings 60 and overlap slightly, to ensure engagement of the stem of cotton plant 64 to cause the rotation of the casings about inner stationary cylinders 62. The space 66 within each cylinder 62 is a vacuum chamber.

In the preferred embodiment of the invention, each housing 28(a), (b), (c) or (d) is twelve and one half inches wide, thirty three and one half inches long and approximately 41 inches high. The pair of housings 28(c) and 28(d) are set four inches apart. The guide means 30(c) and (d) are affixed to the housings and are, where juxtaposed, the length and width are the same as the housings. Each tapers outward and downward from the housing to approximately one inch at the tip. The tips are eighteen inches from the housings and sixteen inches apart.

Air is sucked through the top of each said vacuum chamber by pipes 32. The bottom of said chambers are closed but there are spaces or air ports 68 partitioned between radial teeth 70 and 72 on the rotatable casing 60. Said air ports are openings in the substantially vertical wall of said rotatable casing designed to come into direct contact with the cotton plants as the cotton is being harvested. There are no arm-like extensions from the casing which internally funnel air to the casing air ports. Air is sucked directly through the side of the casing. The passage of air through air ports 68 is possible when said ports are aligned with the substantially vertical slot opening 74 located in the substantially vertical side wall of said stationary cylinders 62. Each respective slot is faced toward the cotton row and thus it can be understood that when the units are in contact with the cotton plant, cotton will be sucked off of the plant through air ports 68 and slot 74 in cylinders 60 and 62 respectively, into the vacuum chamber 66, through the connecting pipes 32, and through the pneumatic conveying apparatus into the hopper.

It will be noted that the harvesting units 56 and 58 are off-set, one in back of the other. Such positioning causes the slots 74 to also be off-set so that the suction pull from within unit 56 is not neutralized by the suction pull from within 58. Rather, the suction in each unit is applied to the plant from respective sides consecutively. The harvesting units 56 and 58 will be further described in relation to FIGURE 5.

FIGURE 5 is a cutaway elevational view of the harvesting unit showing rotatable casing 60 about the stationary cylinder 62 and the means 59 for rotating the one about the other.

The cutaway view shows the vertical slot 74 in the inner stationary cylinder 62. Said stationary cylinder a substantially air tight bind. Said pipe is supported by the top of housing 28(d).

The base of said stationary cylinder is affixed to the frame of housing 28(d) by means of stationary upright stub shaft 78 which is secured to the floor of housing 28(d) by a cap screw 80. The shaft 78 passes through and carries a conventional bearing element 82. A cone shape depending boss 83 is secured to the center of the undersurface of a rotatable plate 84 to mate with the outer race of bearing element 82. The shaft 78 then passes through the floor of stationary cylinder 62 and into a vertical bushing 85 which is rigidly secured to the floor of said stationary cylinder. The upper end of stationary shaft 78 butts the interior of the upper end of said bushing and set screws 86 are tightened to prevent movement.

The stationary cylinder 62 does not come into contact with rotatable plate 84 but is suspended above it by the stationary upright stub shaft. By means of the depending boss 83, the plate 84 freely revolves about the stub shaft on the bearing element 82. The edge of said rotatable plate extends downward at right angles from the face of the plate forming a depending skirt 87 which is in alignment with wall of the stationary cylinder 62 thereby achieving substantially the same diameter as said stationary cylinder. The height of the walls of said depending skirt 87 is substantially the same height of the bearing element 82 but does not extend to come into contact with the bottom of housing 28(d). The lower edge of the depending skirt wall 87 flares outward at right angles to form a ledge 88, upon which the rotatable casing 60 rests, and to which it is secured by means of set screws 90. It can thereby be seen that the rotatable casing 60 can freely rotate with the skirted plate 84 about the stationary upright shaft 78 and stationary cylinder 62 by means of bearing element 82.

Figure 7:
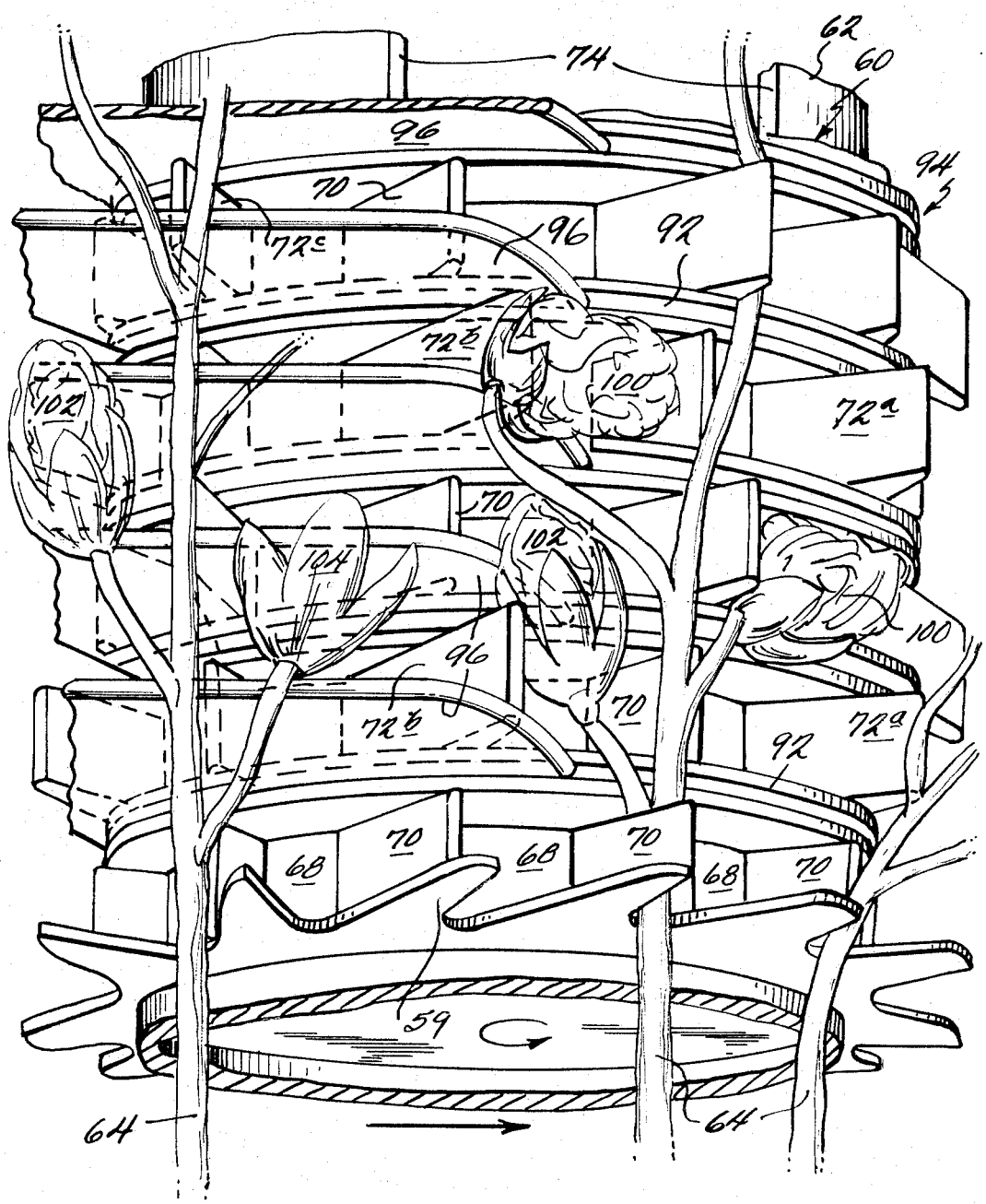
FIGURE 7 is a fragmentary perspective view of the revolvable casing illustrating three phases of the harvesting process.

Referring now specifically to the rotatable casing 60, as best illustrated in FIGURES 5 and 7, it can be seen that it is composed of a series of rows of teeth stacked vertically upon rings and secured together so as to form a cylinder.

Considering the construction of the rotatable casing from the bottom up, above the rotation means, the disk comprised of sprocket teeth 59 extends beyond the long harvesting teeth 72. These sprocket teeth engage the plant stem and turn the freely rotatable cylinder as the tractor carrier moves past the plant.

The first row of teeth resting upon and secured to sprocket row 59 is composed of a series of short teeth 70 between which are air ports 68. The dimensions of these ports are defined by partition comprised of the edges of the teeth 70, the top edge of sprocket disk 59 and the lower edge of ring 92. The next row is composed of a series of alternating short teeth 70 and long teeth 72 which are substantially vertically aligned with the teeth in the first row. There are similar air spaces 68 which are defined by the generally vertical partitions comprised of teeth 70 and 72 and the generally horizontal rings 92.

The third row from the base is similarly composed except a short tooth is aligned substantially vertically over a long tooth and vice versa. The entire remaining cylinder consists of a repetition of this horizontally and vertically aligned alternating pattern. The teeth are all slanted away from the direction of the rotation of the wheel.

In the preferred embodiment, each row of teeth is separated by ring 92. The rings are of sufficient height to enable circumferential grooves 94 to be cut there around. These grooves are designed to mate with a series of bar guards 96 which extend from the housings 28(c) and (d) as shown encasing units 56 and 58 in FIGURE 4. It can be seen that these guards will prevent the cotton plants from wrapping around the revolvable cylinders.

The interior edge of the guard bars may be of several shapes, including a straight edge which would contact the rotatable casing tangentially. In the preferred embodiment, which is best illustrated in FIGURES 4 and 7, the bars have an arcuate edge which curves around the cylinder. While it is not critical, the inventor prefers that the bars be received by the circumferential grooves in the ring. This adds to the smooth transition of the plant past the harvesting unit.

The outward curve of the bar coupled with the fact that the bar extends substantially to the center of the vertical slot, adds a new dimension to pneumatic cotton harvesting methods. The mature cotton is cammed toward the casing as previously explained, and the suction pulls the lint into the air ports. Then, while the lint is moving between the air ports, the plant and burrs on the plant are simultaneously cammed generally vertically and rearwardly away from the casing by the bar.

Thus, the lint is removed from the burr according to a method utilizing steps which are directly contradictory to the normal picking procedures. The prior art discloses various attempts to duplicate hand picking of cotton plants by grasping or sucking the lint and pulling it from the branch. The present invention discloses means to secure the lint and move the branch away, thereby moving away the source of trash which defiles the harvest.

While the movement of the branch away from the lint by means of the camming action of the guard bar is the primary means to separate the branch from the lint, the unique ease with which the slanting teeth slip out of the plant, the cutting off of the suction once the lint is removed from the burr and the restricted air port size all add to insuring that twigs and other trash will not be sucked into the suction chamber 66 with the lint.

As the tractor moves forward, the cylinder rotatingly moves the plant past the vertical slop and the suction pull upon the plant ceases. The undamaged plant then passes from between the harvesting units.

The depth of the rings is dependent upon the requirements that they be sufficiently deep to give rigid support to the teeth while at the same time leaving enough space in the center of the cylinder for pneumatic removal of the cotton lint.

In the preferred embodiment of the harvesting unit, the dimensions are as follows: the radius of the stationary cylinder is 7 27/13 inches; the wall of the stationary cylinder is 9/32 inch; there is a 1/32 inch space between the stationary cylinder and the rotatable cylinder. The teeth should be angled so that the long teeth can assist in removing the cotton by extending into the branches of the cotton plant, camming the branches toward the air sockets where the mature cotton is sucked off, and then releasing the branches as the cylinder rotates past the plant. In the preferred embodiment, the horizontal teeth extend radially 1/4 inch before the rearward edges extend away from the direction of rotation at a 42° angle from the base 1/2 inch wide and 2 1/2 inches high, tapering to vertically rounded tips; where the teeth are in contact with the rings, they extend another 1/4 inch high to fit into a groove in the rings thereby causing a more rigid structure. The rings are approximately 1 1/4 inches wide and 1/2 inch high with a 1/4 inch circumferential groove; the length of the short teeth is dependent upon the width of the ring, but it has been found preferable to round the tip of the short teeth just beyond the outer edge of the ring. This prevents wedging and eliminates sharp edges which could break the plant. By placing the teeth at a 42° angle, it can readily be seen that the short teeth must be longer than 1 1/4 inches.

The length of the long teeth is dependent upon personal preference but they must be sufficiently long to be of assistance in removing cotton but not so long as to cause breakage. In the preferred embodiment, the teeth extend radially for a 1/4 inch as disclosed above, then slant away from the directional rotation at a 42° angle and, taper to a rounded tip one inch beyond the outer edge of the ring.

The space 68 between the teeth must be of sufficient dimensions to allow mature cotton to be sucked into the vacuum chamber 66 while at the same time it must be small enough to prevent unopened cotton bolls from entering or wedging. The inventor has found the most preferred dimensions of the air space to be 1 1/2 inches wide and 1 1/4 inches high.

It is readily understood that these dimensions are defined by the distance between the teeth and the height of the teeth.

Thus, in the preferred embodiment there are six short teeth and six long teeth alternately spaced between two rings thus defining 12 air ports through which cotton may be sucked.

The twelve sprocket teeth extending from the base of the revolvable casing are arranged so that the inside edge of each tooth is in alignment with the inside edge of the long and short harvesting teeth. This edge extends from a base approximately 2 1/2 inches wide at a 42° angle to a rounded tip 2 inches from the outside perimeter of the rings. The edge of one sprocket tooth curves into the edge of this next tooth at a point beyond the edge of the upper rings so that the sprocket teeth will wedge the plant stem. The widest exterior diameter of the sprocket teeth assembly is 14 1/2 inches.

While the rotatable casing may be cast as a single unit, the inventor has constructed the cylinder by casting each individual row, placing one on top of the other in vertical and horizontal alignment and then securing them together by means of generally vertical rods (not shown). The preferred height of the rotatable casing is 38 inches including a 2 1/2 inch sleeve on the top and a 1 5/8 inch base including the sprocket teeth disk which is 1/4 inch high.

In the preferred embodiment, the stationary cylinder is approximately 41 inches high and extends beyond the sleeve of the rotatable casing approximately 3 inches. The 8 inch suction pipe fits over this extension. The slot in the stationary cylinder is 2 1/2 inches wide and extends the entire 34 inch length of the harvesting apparatus of the rotatable cylinder.

FIGURE 6 is a top sectional view of the revolvable casing 60 illustrating its effect upon plants 64 as it passes by the plants. The direction of the tractor is from right to left. The bottom casing 60 is revolving clockwise and the top casing 60 is revolving counter-clockwise. It can be appreciated that as a plant moves between the revolvable casings the lighter more spread out upper branches first contact the cylinders. Because the suction slots 74 are substantially at right angles to the cotton row, there is no suction force to draw the upper branches toward the casing when contact is first made. Rather, they are bent away from the casings generally toward the direction in which the tractor is moving. (See FIGURE 7.)

Because the upper part of the plant is bent, the casing rotatingly engages the plant at substantially that point when the sprocket teeth 59 contact and engage the fixed stem of the plant.

The long teeth 72 move into the branches and the slant of the teeth causes the branches to be cammed toward the rings 92. By this time, the tractor is moved ahead sufficiently so that the plant is adjacent to the suction slot. The forward motion of the tractor is offset by the free moving reverse revolution of the revolvable casings and the mature cotton 100 is sucked through the openings in the revolvable casings and the suction slot in the side wall of the stationary cylinder. The empty burrs 104 pass by unharvested.

Besides camming the branches and supporting them next to the cylinder rings, it will be remembered that the slanted teeth are designed so as to release the plant as the tractor moves forward past the plant and the suction is cut off. Branches and unopened cotton bolls pass between the revolving casings unmolested.

The teeth have in no way caused the branches to break or the bolls to be knocked off but rather give support to the plant as the harvesting units move by. Branches, burrs, and unopened bolls have not been sucked into the suction chamber because the spaces between the rings and teeth are designed to be small enough to prevent their passage, and while the suction is strong enough to dislodge the cotton from the burrs, it will not break the burrs off the branches.

The short teeth 70 act as spacers to separate the distance between the long teeth. Such a separation is necessary for two reasons. First, if the short tooth was removed, the greater horizontal distance between the long teeth would allow twigs and other trash to be sucked between the long teeth. Second, if long teeth were substituted for short teeth and the other long teeth were retained, the close vertical proximity of the long teeth, branches, twigs and other trash would get caught in the 1/2 inch space where the ring passes between the teeth and broken off (see FIGURES 5 and 7). While the elimination of this 1/2 inch space is mechanically possible, it is preferable to leave it so that the guard bars 96 may be fully utilized to cam the plants away as tractor passes. In addition to problems of breakage, of the plant, open bolls would also be dragged over this 1/2 inch space and a few locks of cotton lint would tend to get wedged therein and would be lost as the machine moves past the plant. The wedged cotton lint would either remain on the plant, drop to the ground when suction is cut off or build up between the teeth. Because of its fibrous nature, twigs, dirt and other trash might collect in the lint upon further revolutions of the casing thereby ruining the quality of the trapped lint and lowering the overall quality of the entire harvest if and when the trapped lint finally builds to a point where it is sucked into the cylinder.

Closer horizontal alignment of long teeth would also tend to increase the possibility of unopened bolls, branches and other trash becoming wedged between the teeth and be broken off.

FIGURE 7 shows a casing which would be mounted on the left-hand side of the row as the tractor moves from left to right in the drawing. The casing 60 is revolvable clockwise as the sprocket teeth 59 engage the stem of the cotton plants 64. Three plants are shown in close proximity to illustrate the three stages of communication between the casing and the plant—engagement, harvest and dis-engagement. It can be seen that the plant on the right is still being bent by the casing and that the sprocket teeth tend to engage the plant before the upper teeth of the casing do. The plant in the middle is in the process of being harvested as it passes the suction slot 74 in the stationary cylinder 62. As is shown, the various branches are cammed toward the rings 92 and the suction is pulling the cotton through the spaces between the teeth. The mature cotton bolls are designated 100 and the unopen bolls 102. It can be seen that the unmatured bolls are too large to pass through the spaces. Numeral 104 indicates a burr from which the cotton lint has been removed and it now passes onto the left as the tractor moves to the right.

FIGURE 7 further illustrates a side view of the long teeth 72 engaging the plant. In this figure, all the teeth extend slantingly outward from left to right from the cylinder. Because of the direction of the tractor, the relationship of the teeth to the plant is such that teeth 72(*a*) slant forward to engage the plants, 72(*b*) are substantially perpendicular to the plants and 72(*c*) face rearwardly as the cylinder passes by and the plant is directed away from the cylinder by guard bars 96.

Obviously many modifications and variations of the present invention are possible in the light of the above teachings. It is therefore to be understood that within the scope of the appended claims, the invention may be practiced otherwise than as specifically described.

I claim:

1. In a substantially vertical cotton harvesting unit having a hollow fixed cylinder defined by substantially vertical walls in which a substantially vertically disposed slot has been formed to enable air to be pulled by suction means through said slot into the interior of said cylinder, and having a cylindrical casing about said cylinder adapted to communicate with said cylinder and rotate thereabout, said cylindrical casing having a substantially vertical exterior surface, containing a plurality of air ports therethrough, the improvement in the construction of said cylindrical casing comprising:

said air ports being large enough to enable cotton lint to be pneumatically sucked through said cylindrical casing but small enough to prevent passage of branches, trash and unopened bolls, said air ports further being substantially unobstructed so as to form communications directly with the substantially vertical exterior surface of said exterior wall, thereby permitting a harvest of cotton plants by a direct contact of cotton lint with said vertical exterior surface of said exterior casing so that the cotton lint may be sucked off on the cotton plants without damage to the plant.

2. A cotton harvesting unit as claimed in claim 1 wherein said cylindrical casing is further comprised of: multiple vertical levels of hollow circular partitions horizontally disposed, the inside diameter of said horizontally disposed partitions defining the inside diameter of said casing and the outside diameter defining the outside diameter of said cylindrical casing, and substantially vertical partitions between the levels of said horizontally disposed partitions, the intersection of said horizontally disposed partitions and said vertically disposed partitions defining the perameters of said air ports.

3. A cotton harvesting unit as claimed in claim 2 wherein each of said horizontally disposed partitions have a circumferential groove thereabout capable of engaging a guard bar whereby cotton plants may be prevented from wrapping around said rotatable casing.

4. In combination: a cotton harvesting unit as claimed in claim 3, and a series of horizontal bars mounted behind the unit in relation to the translational operational movement of the unit, parallel to the translational operational movement, extending forward to contact the unit, the terminus being a point on the rotatable casing opposite the generally vertical slot, each bar having an interior and an exterior edge, said exterior edge arcuately curving outwardly and rearwardly from the terminus and said unit.

5. A combination as claimed in claim 4 wherein that forward portion of said interior edge of said horizontal bars that contacts said rotatable casing is concavely arcuated to complement the convex curvature of said rotatable casing.

6. A combination as claimed in claim 5 wherein said terminus of said parallel bars is positioned on the rotatable casing generally opposite the center of the substantially vertical slot.

7. A combination as claimed in claim 6 wherein said forward portion of said parallel bars is received by respective circumferential grooves in a sliding engagement.

8. A cotton harvesting unit as in claim 2 wherein at least some of said substantially vertical partitions extend radially beyond the exterior surface of said casing whereby tooth like projections are formed.

9. A cotton harvesting unit as claimed in claim 3 wherein said teeth are slanted away from the direction of operational rotation.

10. A cotton harvesting unit as claimed in claim 9 wherein said teeth slant at an angle of 38 to 45° from said exterior surface of said rotatable casing at a line tangent to said exterior surface at the point of intersection between said tooth and said exterior surface.

11. A cotton harvesting unit as claimed in claim 9 wherein the teeth are of at least two alternating lengths.

12. A cotton harvesting unit as claimed in claim 11 wherein the teeth are of two alternating lengths horizontally and vertically aligned, the shorter teeth being substantially even with the outer edge of the substantially horizontal rings, and the longer teeth extending beyond the outer edge of the substantially horizontal rings, and being sufficiently long so as to be capable of engaging the branches of cotton plants.

13. A cotton harvesting unit as claimed in claim 12 wherein said longer teeth extend to a terminus one inch beyond the exterior surface of said rotatable casing.

14. A cotton harvesting unit as claimed in claim 13 wherein said teeth slant at an angle of 38 to 45° from said exterior surface of said rotatable casing at a line tangent to said exterior surface at the point of intersection between said tooth and said exterior surface.

15. A cotton harvesting unit as claimed in claim 2 wherein the lowermost ring has mounted thereon a series of radially extending sprocket teeth which are capable of engaging the stem of the cotton plant, thereby rotating the rotatable casing as it moves past a cotton plant during the harvesting process.

16. In combination: a cotton harvesting unit as claimed in claim 2, and an attachment for a tractor, said attachment comprising a frame upon which said harvesting unit is mounted, said frame having four generally upright beams and four substantially horizontal beams joiningly connected to form two substantially rectangular frames, each having an upper and lower substantially horizontal beam and a front and back generally upright beam, said two rectangular frames being secured together by substantially horizontal cross beams joiningly connecting the upper substantially horizontal beams along the length of said beams and joiningly connecting the lower substantially horizontal beams at approximately the point of joinder of the lower substantially horizontal beams and the forward upright beams, said lower substantially horizontal beams extending forward to carry one or more of said cotton harvesting units to pneumatically harvest cotton, said lower beams being capable of sliding into substantially upright U supports, at least two individual U supports being mounted on the rear axle of the tractor, each capable of receiving a lower substantially horizontal beam, and at least one U support being mounted on the front of the tractor and capable of receiving both lower substantially horizontal beams, the effect being that said frame may be slidably attached and detached by moving the tractor rearwardly or the frame forwardly.

References Cited
UNITED STATES PATENTS

| | | | |
|---|---|---|---|
| 858,371 | 7/1907 | Corley | 56—30 |
| 2,703,955 | 3/1955 | Parker et al. | 56—44 |
| 2,836,951 | 6/1958 | Annis | 56—30 |
| 3,144,742 | 8/1964 | Zeismer | 56—12 |
| 3,332,220 | 7/1967 | Lofgreen | 56—30 |

RUSSELL R. KINSEY, *Primary Examiner.*